Patented Nov. 9, 1948

2,453,627

UNITED STATES PATENT OFFICE 2,453,627

2 - SUBSTITUTED - 3,4 - DIAMINO - FURAN URETHANS AND DERIVATIVES THEREOF

Klaus Hofmann, Pittsburgh, Pa., assignor to Ciba Pharmaceutical Products, Incorporated, Summit, N. J., a corporation of New Jersey No Drawing. Application March 27, 1945, Serial No. 585,193

10 Claims. (Cl. 260—345)

The present application is in part a continuation of copending application, Serial No. 511,610, filed on November 24, 1943 (U. S. Pat. No. 2,432,016), which is itself in part a continuation of copending application, Serial No. 459,674, filed on September 25, 1942 (U. S. Pat. No. 2,382,418), and the invention to which the present application relates is a further development of the inventions described and claimed in said copending applications.

The present invention relates to a process of preparing 2-substituted-3,4-diamino-furan urethans and their corresponding saturated analogs of the general structure I or IA:

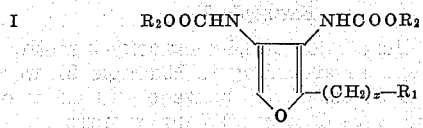

I

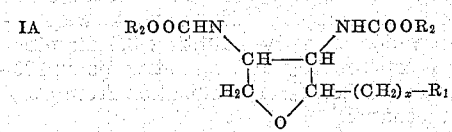

IA wherein R₁ represents a hydrogen atom, a carboxyl group or a group which is convertible to a carboxyl group, and R₂ represents an alkyl, aralkyl or aryl radical; and to the resultant products.

According to the present invention the said furan derivatives are prepared by reacting a 2-substituted furan-3,4-dicarboxylic acid II with a halogenating agent to produce the corresponding diacid halide III, which thereafter is treated with an alkali metal azide to form the corresponding azide of the Formula IV. In order to obtain the various 2-substituted 3,4-diamino-furan urethans, the azide IV is treated with the corresponding alcohol. The compounds so obtained have the general Formula I.

In the course of the foregoing reactions, the substitutents R₁ may be protected by the preparation of suitable derivatives, e. g., in the case of a carboxyl group: esters, amides, etc., in the case of a hydroxyl group: esters, in the case of an aldehyde group: acetals, thioacetals, etc.

Such compounds I can be transformed with great ease and good yields by low pressure catalytic hydrogenation into compounds of the general structure IA. The ease with which the substituted urethans are reduced to the corresponding tetrahydro compounds is remarkable, considering the fact that reduction of 2-substituted furan-3,4-dicarboxylic acids to the corresponding tetrahydro derivatives requires high pressure and elevated temperatures. The following formulae illustrate the procedure:

II

III

IV

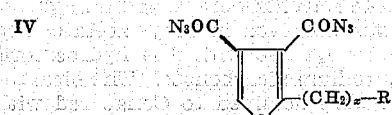

I

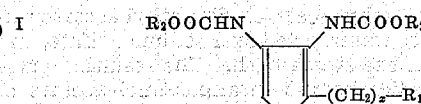

IA

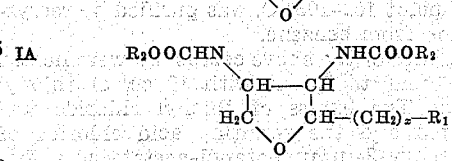

The new urethans are intermediates in a synthetical procedure for the preparation of biotin analogs, which is an ultimate object of the invention.

Suitable starting materials are the 2-substituted furans of the Formula II wherein R₁ stands for a hydrogen atom, a carboxyl group or a group convertible into a carboxyl group, and $x$ stands for one of the numbers 1–6 inclusive. These starting compounds may be prepared, for example, according to the disclosure of copending application Serial No. 459,674 (U. S. Pat. No. 2,382,418), by reacting a correspondingly 2-substituted furan derivative with an acetylene dicarboxylic ester, catalytically hydrogenerating the resultant complex, distilling the resultant hydrogenated compound to eliminate a molecule of ethylene therefrom, and saponifying the resultant ester.

The radical R₂ in the general Formulae I and IA is an alkyl radical such as methyl, ethyl, isopropyl, etc., or an aralkyl radical such as phenylethyl, etc., or an aryl radical such as phenyl, paratolyl, etc.

Among the groups which can be transformed to a carboxyl group the following ones may be mentioned: aliphatic and aromatic ester groups such as the methyl, ethyl, propyl, phenyl, benzyl ester groups; aliphatic and aromatic amide groups such as the amide, mono- and dimethyl-amide, diethyl amide, piperidide, anilide, and N-methylanilide groups; the nitrile group; the hydroxyl group; the halogen atoms; the aldehyde group and derivatives thereof such as the acetal group.

The catalytic reduction of the furans to the corresponding tetrahydrofuran compounds is preferably carried out in organic acid medium such as acetic acid, acetic acid plus methanol, propionic acid, etc. As catalysts there may be used metals of the platinum group such as platinum, palladium or others, as such or on carriers.

The new compounds are useful for the preparation of substances which are valuable for therapeutic purposes or as intermediates in the production of such substances.

The term "cis", as it occurs in the following examples and claims, designates the relative position of the amino or substituted amino groups at carbon atoms 3 and 4 of the furan or tetrahydrofuran ring, as the case may be.

The following examples illustrate methods of carrying out the present invention, but it is to be understood that the examples are given by way of illustration and not of limitation.

*Example 1*

A solution of 5.0 g. of 3,4-dicarboxy-2-furanpentanol in 20 cc. of dry pyridine and 12 cc. of acetic anhydride was kept at room temperature over night. The solvents were removed in vacuo, the residue was dissolved in ethyl acetate, and the solution was washed with 2 N hydrochloric acid and 10% sodium bicarbonate. The bicarbonate extracts were acidified to Congo red with concentrated hydrochloric acid and were then extracted with ethyl acetate. The ethyl acetate was washed with water, dried over sodium sulfate, and removed on the steam bath. The resulting crystalline 3,4-dicarboxy-2-furanpentanol-acetate of melting point 102–103° C. was purified by recrystallization from benzene.

Five grams of the above compound were heated for one hour to 90° C. with 10 cc. of thionyl chloride. The excess of thionyl chloride was evaporated and the resulting acid chloride of 3,4-dicarboxy-2-furanpentanol-acetate was distilled in vacuo.

A solution of 11.0 g. of the above acid chloride in 100 cc. of ether was stirred for two hours in an ice bath with a solution of 10 g. of sodium azide in 25 cc. of water, 20 cc. of 40% potassium hydroxide were then added, and stirring was continued for an additional hour. The ether layer was separated, dried over sodium sulfate, and the oily azide which was obtained on evaporation of the ether solution was dissolved in 100 cc. of absolute alcohol, and was placed in a round bottomed flask, equipped with a gas inlet tube and a reflux condenser. The end of the reflux condenser was connected to a calcium chloride tube, and a gas washing bottle filled with concentrated sulfuric acid, and a slow stream of nitrogen was passed through the apparatus. The flask was then heated slowly to 45–50° C., and maintained at this temperature until the initial rapid evolution of nitrogen had almost ceased. The temperature was then raised to the boiling point of the alcohol, and the solution was refluxed for two hours.

The alcohol solution was cooled to 20° C. and 30 cc. of 1 N sodium hydroxide were added and the mixture was kept at room temperature over night. The alcohol was removed in vacuo and the residue was extracted with ether. The ether solution was washed with 2 N hydrochloric acid and 10% sodium bicarbonate, was dried over sodium sulfate, and the ether was removed on the steam bath. Treatment of the residue with a mixture of 2 parts of ether and one part of petroleum ether (30–60° C.) gave the desired 3,4-diaminocarbethoxy-2-furanpentanol of a melting point of 79–81° C.

*Example 2*

A mixture of 5.0 g. of 3,4-dicarboxy-2-methylfuran and 20 cc. of thionyl chloride was heated to 70–80° C. for one hour, and the excess of thionyl chloride was removed in vacuo and distillation of the residue gave the acid chloride of 3,4-dicarboxy-2-methylfuran. A solution of 30.3 g. of the above acid chloride in 380 cc. of ether was added to an ice cold solution of 38.0 g. of sodium azide in 90 cc. of water, and the mixture was stirred in an ice bath for two hours. The ether layer was then separated, washed with ice cold 10% sodium bicarbonate and dried over sodium sulfate. The ether was removed in vacuo at room temperature, and the resulting crystalline azide was dissolved in 400 cc. of absolute alcohol and was decomposed in the manner described in Example 1. The alcohol was removed in vacuo and the yellow oil which resulted crystallized when placed in a refrigerator over night. Recrystallization from methanol at −20° C. gave the desired 3,4-diaminocarbethoxy-2-methylfuran of a melting point of 105–107° C.

*Example 3*

5.0 g. of the diazide of 3,4-dicarboxy-2-methylfuran (prepared according to Example 2) were dissolved in 50 cc. of dry benzene and 4.3 g. of phenol and were decomposed under nitrogen as described in Example 1. The solvents were removed in vacuo, and the resulting 3,4-diaminocarbophenoxy-2-methylfuran, melting point 190–195° C., was purified by crystallization from ethyl acetate-methanol.

*Example 4*

15.0 g. of 3,4-dicarboxy-2-furanbutanolacetate were transformed into the corresponding acid chloride and diazide as described in Example 1. A solution of 10 g. of the aforementioned diazide in 100 cc. of dry methanol was decomposed under nitrogen at 45–60° C., as described in Example 1. The methanol solution was then cooled to 20° C. and 55 cc. of 1 N sodium hydroxide were slowly added while stirring, and the solution was kept at room temperature over night. The methanol was removed in vacuo and the aqueous residue was extracted with ether, and the ether solution was washed with 2 N hydrochloric acid, then with 10% sodium bicarbonate, and then was dried over sodium sulfate. Evaporation of the ether solution gave the desired 3,4-diaminocarbomethoxy-2-furanbutanol.

*Example 5*

5.12 g. of 3,4-diaminocarbethoxy-2-methylfuran (prepared according to Example 2) were dissolved in 100 cc. of glacial acetic acid and were hydrogenated at room temperature and atmospheric pressure in the presence of a palladium on barium sulfate catalyst until 2 mols of hydrogen had been absorbed. The catalyst was removed by filtration and the glacial acetic acid was removed in vacuo. The residue was dissolved in ether and the ether solution was extracted with 2 N hydrochloric acid. The hydrochloric acid extracts were neutralized with 10% sodium bicarbonate and were concentrated to a small volume in vacuo, and the residue was reextracted with ether. The ether solution was dried over sodium sulfate and the ether was removed on the steam bath. The resulting oil crystallized on standing and the crystals were purified by recrystallization from ether. Cis-3,4-diamino-2-methyl-tetrahydrofuran was thus obtained, in needles which melted at 95–96° C.

Example 6

3.28 g. of 3,4-diaminocarbethoxy-2-furanpentanol (prepared according to Example 1) were dissolved in 100 cc. of glacial acetic acid and were hydrogenated at room temperature and slightly elevated pressure in the presence of a palladium on charcoal catalyst until 2 mols of hydrogen were absorbed. The catalyst was removed by filtration and the glacial acetic acid was removed in vacuo. The residue was dissolved in ethyl acetate and the ethyl acetate solution was washed with 10% sodium bicarbonate and was dried over sodium sulfate. Evaporation of the ethyl acetate gave an oil which contained the desired 3,4-diaminocarbethoxy-2-tetrahydrofuranpentanol in the cis-configuration.

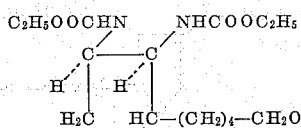

Example 7

4.09 g. of 3,4-diaminocarbethoxy-2-furanvaleric acid piperidide prepared from 3,4-dicarboxy-2-furan-valeric acid piperidide according to the procedure described in Examples 1 and 2 were dissolved in 100 cc. of glacial acetic acid and were hydrogenated at room temperature and atmospheric pressure in the presence of a platinum black catalyst until 2 mols of hydrogen had been absorbed. The catalyst was removed by filtration and the solvent was removed in vacuo. The residue was dissolved in ethyl acetate, and the ethyl acetate solution was extracted with 10% sodium bicarbonate, and was dried over sodium sulfate. Evaporation of the ethyl acetate gave an oil which contained the desired cis 3,4-diaminocarbethoxy-2-tetrahydrofuran-valeric acid piperidide.

Example 8

10.0 g. of 3,4-diaminocarbomethoxy-2-furan-butanol (prepared according to Example 4) were hydrogenated at room temperature and atmospheric pressure in 400 cc. of glacial acetic acid in the presence of a palladium black catalyst until 2 mols of hydrogen had been absorbed. The catalyst was removed by filtration, the glacial acetic acid was removed in vacuo, and the resulting oil was dissolved in ethyl acetate. The ethyl acetate solution was washed with 10% sodium bicarbonate, was dried over sodium sulfate, and the solvent was removed in vacuo. Distillation of the residue at 180–200° C. at 0.02 mm. gave a colorless oil which contained the desired cis 3,4-diaminocarbomethoxy-2-tetrahydrofuran-butanol.

Example 9

5.0 g. of 3,4-diaminocarbophenoxy-2-methyl-furan (prepared according to Example 3) were dissolved in 200 cc. of glacial acetic acid, and were hydrogenated at room temperature and atmospheric pressure in the presence of a palladium on barium sulfate catalyst until 2 mols of hydrogen had been absorbed. The catalyst was filtered off, the glacial acetic acid was removed in vacuo, and the residue was dissolved in ethyl acetate. The ethyl acetate extract was washed with 10% sodium bicarbonate, and was dried over sodium sulfate. Evaporation of the ethyl acetate gave a mixture of isomers from which the desired cis-3,4-diaminocarbophenoxy-2-methyl-tetrahydrofuran was separated by fractional crystallization.

Example 10

3.32 g. of cis 3,4-diaminocarbethoxy-2-tetrahydrofuranpentanol were dissolved in 50 cc. of glacial acetic acid, and 100 cc. of a 2% solution of chromic acid in glacial acetic acid were slowly added. The mixture was kept at room temperature for twelve hours and the excess of chromic acid was destroyed by the addition of methanol. The solution was evaporated to dryness in vacuo and the dark green residue was dissolved in water and was extracted with ethyl acetate. The ethyl acetate soluble parts were separated into acid and neutral substances with 2 N sodium carbonate in the usual manner. From the respective acid fraction cis 3,4-diaminocarbethoxy-2-tetrahydrofuranvaleric acid was obtained.

Having thus described the invention, what is claimed is:

1. The 2-substituted furan compounds of the formula

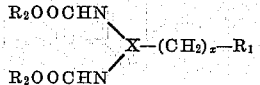

wherein X is a nucleus selected from the group consisting of the furan and tetrahydrofuran nuclei, the R₂OOCHN— groups being severally attached in the 3 and 4 positions of the said nucleus and the —(CH₂)ₓ—R₁ group being attached in the 2-position of the said nucleus, x stands for one of the integers 1, 2, 3, 4, 5 and 6, R₁ stands for a member selected from the group consisting of hydrogen, hydroxyl, carboxyl, carboxylic acid ester groups and carboxylic acid amide groups, and R₂ stands for a member selected from the group consisting of alkyl, aralkyl and aryl.

2. The 2-substituted furan compounds of the formula

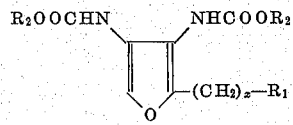

wherein x stands for one of the integers 1, 2, 3, 4, 5 and 6, R₁ stands for a member selected from the group consisting of hydrogen, hydroxyl, carboxyl, carboxylic acid ester groups and carboxylic acid amide groups, and R₂ stands for a member selected from the group consisting of alkyl, aralkyl and aryl.

3. The 2-substituted tetrahydrofuran compounds of the formula

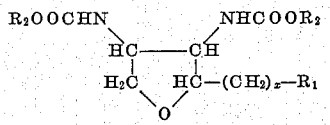

wherein x stands for one of the integers 1, 2, 3, 4, 5 and 6, R₁ stands for a member selected from the group consisting of hydrogen, hydroxyl, carboxyl, carboxylic acid ester groups and carboxylic acid amide groups, and R₂ stands for a member selected from the group consisting of alkyl, aralkyl and aryl.

4. A 3,4-diaminocarbethoxy-2-furanpentanol of the formula

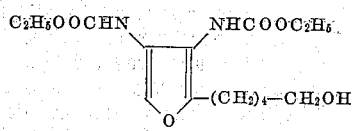

5. A 3,4-diaminocarbethoxy-tetrahydro-2-furanpentanol of the formula

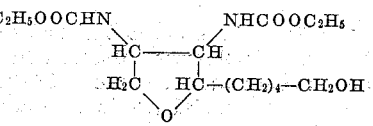

6. The cis-3,4-diaminocarbethoxy-tetrahydro-2-furanpentanol of the formula

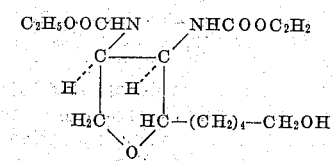

7. In a process for the manufacture of a biotin analog, the step of subjecting a compound of the formula

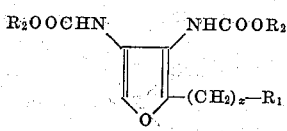

wherein R₁ is a member selected from the group consisting of hydrogen, hydroxyl, carboxyl, carboxylic acid ester groups and carboxylic acid amide groups, x stands for one of the integers 1, 2, 3, 4, 5 and 6, and R₂ is a member selected from the group consisting of alkyl, aralkyl and aryl, to the action of hydrogen in the presence of a hydrogenating catalyst, whereby the furan ring is converted into a tetrahydrofuran ring.

8. In a process for the manufacture of a biotin analog, the step of subjecting a compound of the formula

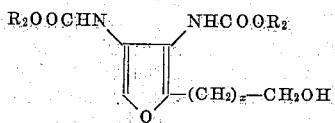

wherein x stands for one of the integers 1, 2, 3, 4, 5 and 6, and R₂ stands for a member selected from the group consisting of alkyl, aralkyl and aryl, to the action of hydrogen in the presence of a hydrogenating catalyst, whereby the furan ring is converted into a tetrahydrofuran ring.

9. In a process for the manufacture of a biotin analog, the step of subjecting a compound of the formula

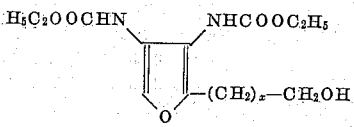

wherein x stands for one of the integers 1, 2, 3, 4, 5 and 6, to the action of hydrogen in the presence of a hydrogenating catalyst, whereby the furan ring is converted into a tetrahydrofuran ring.

10. In a process for the manufacture of a biotin analog, the step of subjecting a compound of the formula

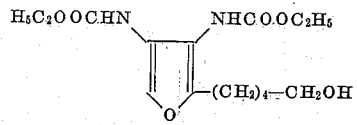

to the action of hydrogen in the presence of a hydrogenating catalyst, whereby the furan ring is converted into a tetrahydrofuran ring.

KLAUS HOFMANN.

REFERENCES CITED

The following references are of record in the file of this patent:

UNITED STATES PATENTS

| Number | Name | Date |
| --- | --- | --- |
| 2,005,538 | Engelmann | June 18, 1935 |
| 2,231,787 | Adams et al. | Feb. 11, 1941 |
| 2,317,286 | Martin et al. | Apr. 20, 1943 |

Certificate of Correction

Patent No. 2,453,627.

November 9, 1948.

KLAUS HOFMANN

It is hereby certified that error appears in the printed specification of the above numbered patent requiring correction as follows:

Column 2, line 45, for the word "hydrogenerating" read *hydrogenating*; and that the said Letters Patent should be read with this correction therein that the same may conform to the record of the case in the Patent Office.

Signed and sealed this 22nd day of March, A. D. 1949.

[SEAL]

THOMAS F. MURPHY,
*Assistant Commissioner of Patents.*